(No Model.) 2 Sheets—Sheet 1.

W. GOULDEN.
VELOCIPEDE.

No. 404,832. Patented June 11, 1889.

Witnesses:
Watson B R Goulden
Francis Redfern

Inventor:
William Goulden (No Model.) 2 Sheets—Sheet 2.

W. GOULDEN.
VELOCIPEDE.

No. 404,832. Patented June 11, 1889.

Witnesses:
William Goulden Inventor:

UNITED STATES PATENT OFFICE.

WILLIAM GOULDEN, OF NO. 1 DONEGAL PLACE, CLAPTON, LONDON, COUNTY OF MIDDLESEX, ENGLAND.

VELOCIPEDE.

SPECIFICATION forming part of Letters Patent No. 404,832, dated June 11, 1889.

Application filed November 8, 1887. Serial No. 254,652. (No model.) Patented in England October 1, 1887, No. 13,316.

*To all whom it may concern:*

Be it known that I, WILLIAM GOULDEN, a citizen of Great Britain, residing at 1 Donegal Place, Clapton, London, E., in the county of Middlesex, England, a subject of Queen Victoria, have invented certain new and useful Improvements in Velocipedes and other Wheeled Vehicles, (for which I have applied for Letters Patent in England No. 13,316, dated October 1, 1887;) and I do hereby declare that the following is a specification of same.

My invention relates to improvements in velocipedes and other wheeled vehicles running upon rough uneven surfaces, being subjected thereby to excessive strain upon the frame-work and frequent breakage, and exposing the riders to excessive jolting and shaking; and the objects of my improvements are, first, to relieve the excessive strain upon the frame-work when driven rapidly over rough uneven surfaces and to minimize the possibility of breakage and its attendant dangers; secondly, to insulate riders from contact with those parts of a velocipede or other wheeled vehicle which come in violent contact with rough uneven surfaces and obstacles, to prevent the light of the lamp of velocipedes being suddenly extinguished, to provide a safe and elastic seat for a rider of any weight with a vertical down-and-up movement only, and to secure sufficient elasticity to absorb the shock of concussion when by such shock the weight of the rider is multiplied; thirdly, to insure the smooth, noiseless, and vertical down-and-up working of the rod when attached to the seats of velocipedes and other wheeled vehicles, to the steering-wheels and backbones of velocipedes, and when attached in the place of ordinary bow, elliptic, or C springs in wheeled vehicles. I attain these objects by the apparatus illustrated in the accompanying drawings.

Figure 1:
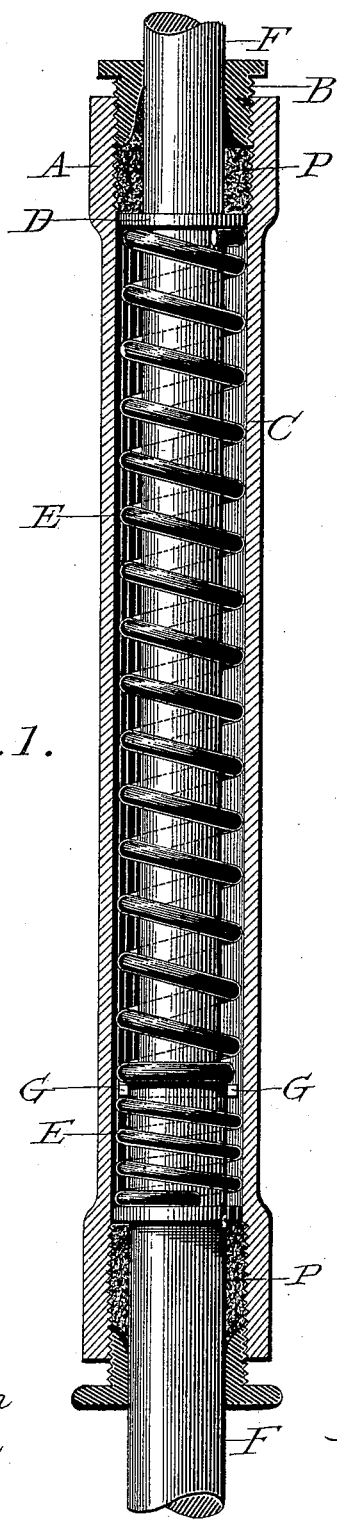
Figure 2:
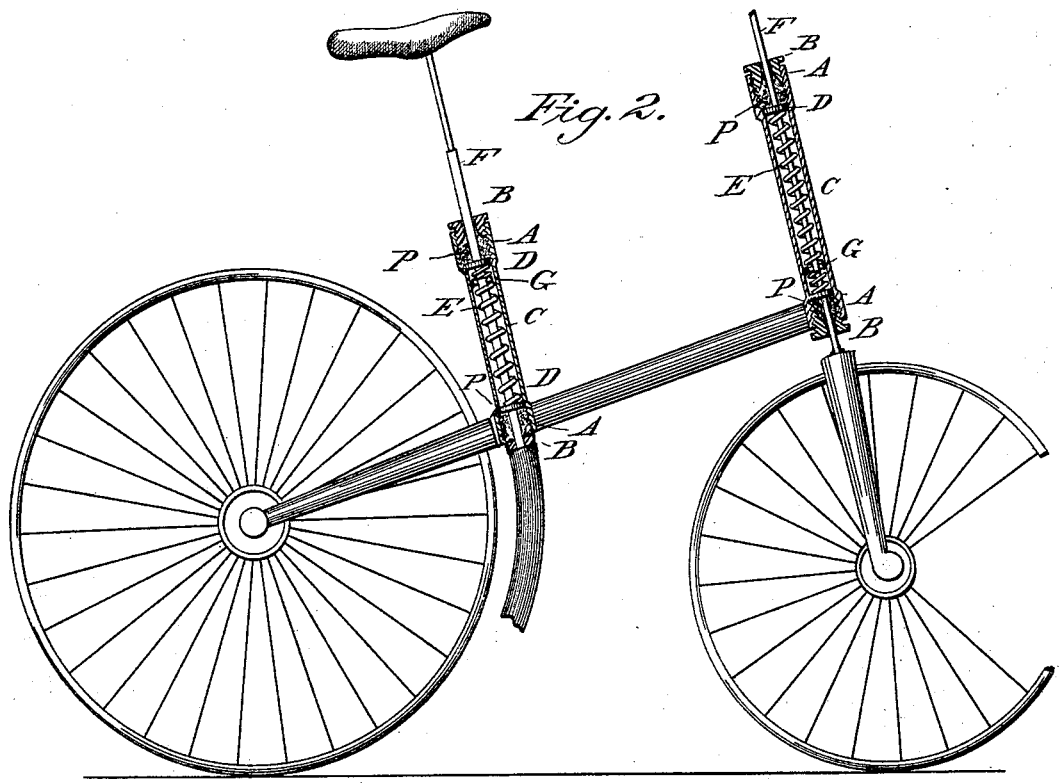
Figures 3, 4:
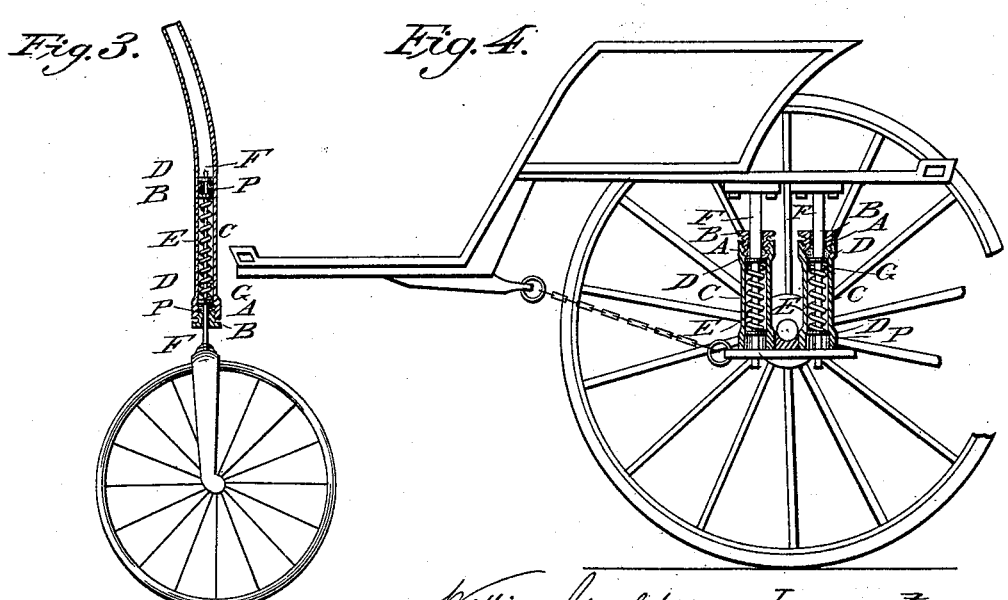

Figure 1, Sheet 1, shows the apparatus separately and in section. Fig. 2, Sheet 2, shows it as applied to the seat pillar of a bicycle and to the steering-post, and may be similarly used in tricycles, both front steering and rear steering. The handle-bar is not shown in this figure. Fig. 3 shows the apparatus as applied to the rear wheel of a bicycle and forming part of the backbone. It may also form the accustomed bicycle-head or be used in place of the accustomed front forks or form part of the backbone of a rear-wheel tricycle, Figs. 2 and 3 being some only of the positions in which the apparatus may be used with advantage. Fig. 4 shows the apparatus as applied to a wheeled vehicle, and it may be similarly applied to cars, carts, wagons, and such like vehicles, or used under the seats of vehicles.

The same letters of reference indicate like parts in the several figures.

A is the outer case of a box, fitted over a cylinder at one end, as in drawings, and tapped at the other end, or may be fitted inside a cylinder, as is conveniently determined by the diameter of the coil of spring the cylinder is to contain.

B is an adjusting piece or gland screwed to fit inside of A and through center to allow a rod to work through freely.

C is a cylinder in diameter outside to fit inside A, as in drawings, but whose diameter, internal and external, may be determined by the diameter of the coil of spring considered sufficient for its object, and of such length as may be necessary to contain a coil spring or springs which by calculation are considered strong enough to carry and sustain the weight placed upon them, and also by their accumulative power to sustain the shock of concussion and take up recoil.

D is a washer fixed upon end of the cylinder and forms the bottom of the box to confine the coil spring or springs in the cylinder, having a hole through the center large enough to allow a rod to pass through freely.

P is the vacuum between the rod and the internal wall of the box, filled up with packing of soft material, and prevents grinding or jamming, and insures the smooth and noiseless working of the rod when put in motion by the action of the spring or springs, and renders the cylinder dust-proof.

E is a coil spring or springs inserted inside a cylinder, working by compression, a rod passing through their center, one end resting upon or against the piston or pin G, and one end upon or against the bottom of the stuffing-box A D. The piston or pin G is placed at a convenient distance, determined by the sustaining power of the spring or springs to sustain the weight placed upon them, and also by their accumulative power to resist the shock of concussion and take up recoil.

F is a rod passing through the stuffing-boxes as a piston-rod, its diameter and strength being determined by the internal diameter of the coil of spring or springs and by the object to which it may be attached at each or either end.

G is a piston fixed to the rod, or may be a pin passing through the rod at a convenient place, and upon or against which the spring or springs rest.

I am aware that prior to my invention wheels of velocipedes have been fixed to rods fitting closely into and passing through tubes and sockets, and having short coil-springs round the rod, outside and inside tubes and sockets, but exposed to the atmosphere, mud, and grit, and also that coil-springs have been used in other wheeled vehicles. I therefore do not claim such a combination, broadly; but What I do claim as my invention, and desire to secure by Letters Patent, is—

The combination, in velocipedes and other wheeled vehicles, substantially as described, of a cylinder with stuffing-box attached at each or either end, the cylinder being dust-proof and containing a long coil spring or springs with piston-rod working through the center of coil spring or springs and stuffing-box or stuffing-boxes and extending through the box or boxes any convenient distance each way for the purpose of attachment at each or either end, substantially as set forth.

WILLIAM GOULDEN.

In presence of—
JOHN ALFRED DOWNING,
HERBERT F. CHIGNALL.